United States Patent
Das

(10) Patent No.: US 8,984,336 B1
(45) Date of Patent: Mar. 17, 2015

(54) SYSTEMS AND METHODS FOR PERFORMING FIRST FAILURE DATA CAPTURES

(75) Inventor: Udipta Das, Pune (IN)

(73) Assignee: Symantec Corporation, Mountain View, CA (US)

( * ) Notice: Subject to any disclaimer, the term of this patent is extended or adjusted under 35 U.S.C. 154(b) by 422 days.

(21) Appl. No.: 13/400,306

(22) Filed: Feb. 20, 2012

(51) Int. Cl.
*G06F 11/00* (2006.01)

(52) U.S. Cl.
USPC ............................................ 714/15; 714/4.1

(58) Field of Classification Search
CPC ....... G06F 8/67; G06F 9/3851; G06F 9/3012; G06F 9/30167; G06F 9/3836; G06F 9/384; G06F 9/3885; G06F 9/3891; G06F 3/0647; G06F 3/0689; G06F 11/1662; G06F 2009/4557; G06F 21/53; G06F 8/30; G06F 8/65; G06F 9/3828; G06F 9/44505
USPC .................................................... 714/4.1, 15
See application file for complete search history.

(56) References Cited

U.S. PATENT DOCUMENTS

| | | | | |
|---|---|---|---|---|
| 6,182,086 B1 * | 1/2001 | Lomet et al. ........................... | 1/1 |
| 6,182,243 B1 * | 1/2001 | Berthe et al. ............... | 714/38.11 |
| 7,308,609 B2 * | 12/2007 | Dickenson et al. ............. | 714/36 |
| 7,376,864 B1 * | 5/2008 | Hu et al. ....................... | 714/6.13 |
| 7,610,510 B2 * | 10/2009 | Agarwal et al. .................. | 714/12 |
| 7,627,728 B1 * | 12/2009 | Roeck et al. ................... | 711/162 |
| 7,725,763 B2 * | 5/2010 | Vertes et al. .................. | 714/6.12 |
| 7,913,105 B1 * | 3/2011 | Ganesh et al. ................ | 709/224 |
| 8,429,630 B2 * | 4/2013 | Nickolov et al. ............. | 717/148 |
| 2005/0102396 A1 * | 5/2005 | Hipp .............................. | 709/224 |
| 2006/0167950 A1 * | 7/2006 | Vertes ........................... | 707/200 |
| 2010/0250750 A1 * | 9/2010 | Massa et al. ................... | 709/226 |

* cited by examiner

*Primary Examiner* — Bryce Bonzo
*Assistant Examiner* — Elmira Mehrmanesh
(74) *Attorney, Agent, or Firm* — ALG Intellectual Property, LLC

(57) ABSTRACT

A computer-implemented method for performing first failure data captures may include 1) identifying a process that has failed within an old process context and is undergoing a first failure data capture within the old process context, 2) identifying at least one resource allocated within the old process context and required for restarting the process in a new process context, 3) freeing the resource from the old process context before terminating the process within the old process context, and 4) initiating the process in the new process context before the process within the old process context has terminated. Various other methods, systems, and computer-readable media are also disclosed.

20 Claims, 6 Drawing Sheets

SYSTEMS AND METHODS FOR PERFORMING FIRST FAILURE DATA CAPTURES

BACKGROUND

Organizations increasingly depend on digital information and services in the course of business. Because of this, administrators managing information technology systems may face increasing demands to improve business continuity by providing high availability to data and services.

When a critical process fails, restarting the process as soon as possible may prove vital to maintaining high availability to related data and/or services. Unfortunately, other tasks may impede the restarting of a process. For example, in order to gather debugging information in the case of a process failure, a first failure data capturing function may gather and/or analyze data within a failed process context. While performing a first failure data capture may provide valuable information for the future, the consequent delay to a complete exit of the failed process context may monopolize a resource allocated within the failed process context (e.g., until the operating system has resolved the old, failed process context). Since restarting the process in a new context may not be possible until the resource is released, performing the first failure data capture may significantly impact the high availability required of the process. Situations in which the first failure data capture involves large amounts of data and/or a host is under a high load may only exacerbate this problem. Accordingly, the instant disclosure identifies and addresses a need for additional and improved systems and methods for performing first failure data captures.

SUMMARY

As will be described in greater detail below, the instant disclosure generally relates to systems and methods for performing first failure data captures by freeing resources from failed process contexts before finishing first failure data capture operations. In one example, a computer-implemented method for performing first failure data captures may include 1) identifying a process that has failed within an old process context and is undergoing a first failure data capture within the old process context, 2) identifying at least one resource allocated within the old process context and required for restarting the process in a new process context, 3) freeing the resource from the old process context before terminating the process within the old process context, and 4) initiating the process in the new process context before the process within the old process context has terminated.

The failure of the process may arise in any of a variety of contexts. In some examples, the process may have failed within a non-virtual environment. The resource may include any of a variety of resources. For example, the resource may include 1) a file descriptor, 2) a shared memory handle, 3) a named pipe, 4) a named socket, 5) a named semaphore, and/or 6) a mapped file.

In some examples, freeing the resource from the old process context before terminating the process within the old process context may include 1) retrieving failure data for the first failure data capture from the resource and 2) freeing the resource after retrieving the failure data and before performing an additional first failure data capture operation within the old process context. The additional first failure data capture operation may include any of a variety of operations. For example, the additional first failure data capture operation may include a core dump of the process.

In some embodiments, freeing the resource from the old process context before terminating the process within the old process context may include 1) loading failure data for the first failure data capture from the resource into volatile memory, 2) freeing the resource after retrieving the failure data, and 3) writing the failure data from the volatile memory to a failure log file after freeing the resource.

In one example, the computer-implemented method may also include reducing a priority of the process within the old context. In this example, the computer-implemented method may reduce the priority of the process after freeing the resource.

In one embodiment, a system for implementing the above-described method may include 1) an identification module programmed to identify a process that has failed within an old process context and is undergoing a first failure data capture within the old process context, 2) a resource module programmed to identify at least one resource allocated within the old process context and required for restarting the process in a new process context, 3) a freeing module programmed to free the resource from the old process context before terminating the process within the old process context, and 4) an initiation module programmed to initiate the process in the new process context before the process within the old process context has terminated. The system may also include at least one processor configured to execute the identification module, the resource module, the freeing module, and the initiation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a process that has failed within an old process context and is undergoing a first failure data capture within the old process context, 2) identify at least one resource allocated within the old process context and required for restarting the process in a new process context, 3) free the resource from the old process context before terminating the process within the old process context, and 4) initiate the process in the new process context before the process within the old process context has terminated.

As will be explained in greater detail below, by freeing resources from failed process contexts before finishing first failure data capture operations, the systems and methods described herein may provide a lower time to recovery for processes without sacrificing the collection of debugging information. These systems and methods may thereby improve high availability linked to such processes, particularly on host systems with high load levels.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
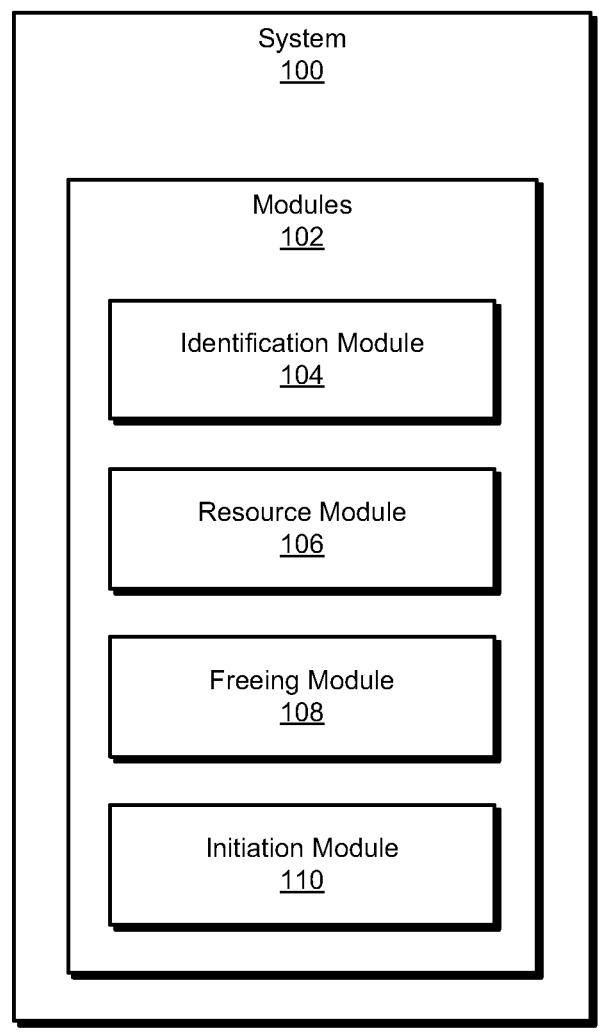
FIG. 1 is a block diagram of an exemplary system for performing first failure data captures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
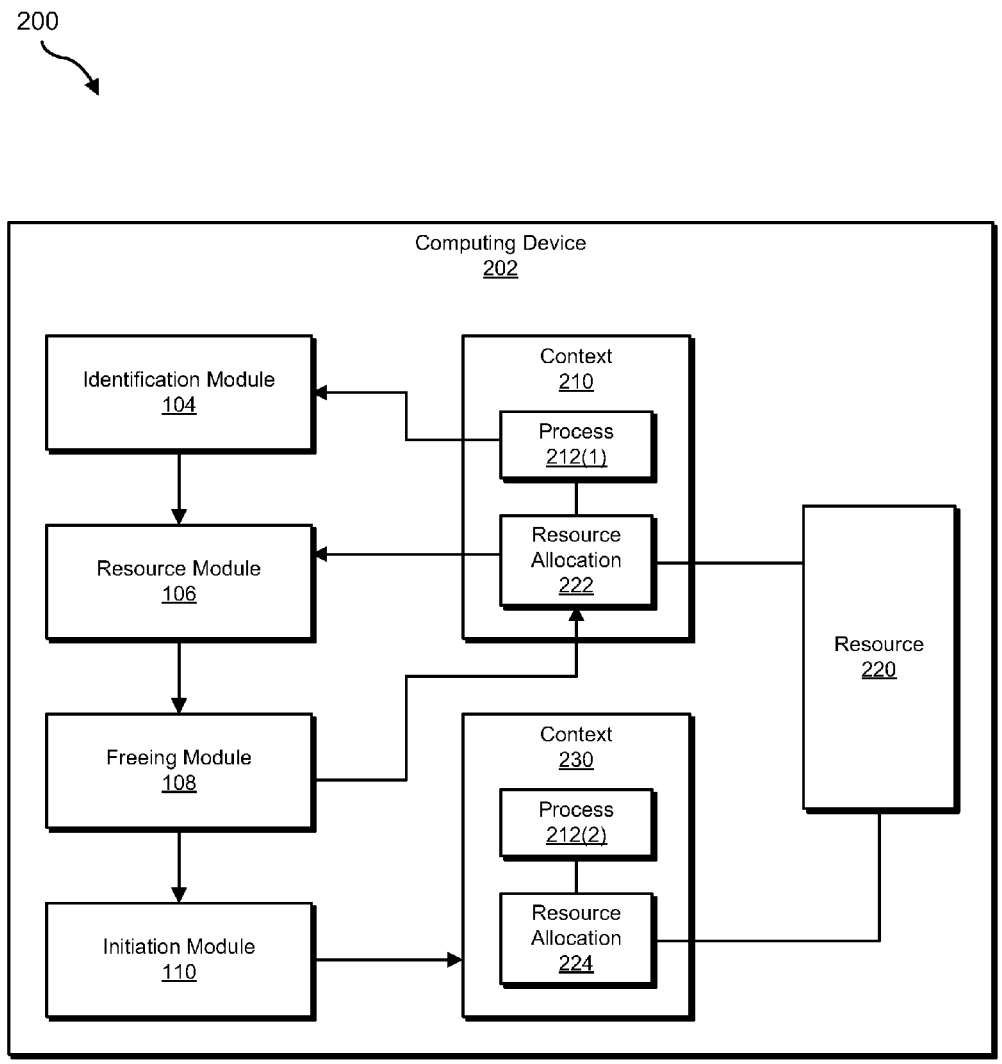
FIG. 2 is a block diagram of an exemplary system for performing first failure data captures.

The following will provide, with reference to FIGS. 1-2, detailed descriptions of exemplary systems for performing first failure data captures. Detailed descriptions of corresponding computer-implemented methods will also be provided in connection with FIG. 3. Detailed descriptions of an exemplary timeline for first failure data captures will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing first failure data captures. As illustrated in this figure, exemplary system 100 may include one or more modules 102 for performing one or more tasks. For example, and as will be explained in greater detail below, exemplary system 100 may include an identification module 104 programmed to identify a process that has failed within an old process context and is undergoing a first failure data capture within the old process context. Exemplary system 100 may also include a resource module 106 programmed to identify at least one resource allocated within the old process context and required for restarting the process in a new process context.

In addition, and as will be described in greater detail below, exemplary system 100 may include a freeing module 108 programmed to free the resource from the old process context before terminating the process within the old process context. Exemplary system may also include an initiation module 110 programmed to initiate the process in the new process context before the process within the old process context has terminated. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 configured to execute a process 212 (e.g., to provide high availability to data and/or services through computing device 202).

In one embodiment, one or more of modules 102 from FIG. 1 may, when executed by at least one processor of computing device 202, facilitate computing device 202 in performing first failure data captures. For example, and as will be described in greater detail below, one or more of modules 102 may cause computing device 202 to 1) identify a process 212(1) that has failed within an old process context 210 and is undergoing a first failure data capture within context 210, 2) identify a resource 220 allocated within context 210 and required for restarting process 212(1) in a new process context 230, 3) free resource 220 from context 210 (e.g., by terminating a resource allocation 222) before terminating process 212(1) within context 210, and 4) initiate process 212(2) (e.g., and allocate resource 220 with a resource allocation 224) in context 230 before process 212(1) within context 210 has terminated.

Computing device 202 generally represents any type or form of computing device capable of reading computer-executable instructions. Examples of computing device 202 include, without limitation, servers, desktops, tablets, laptops, cellular phones, personal digital assistants (PDAs), multimedia players, embedded systems, combinations of one or more of the same, exemplary computing system 510 in FIG. 5, or any other suitable computing device.

Figure 3:
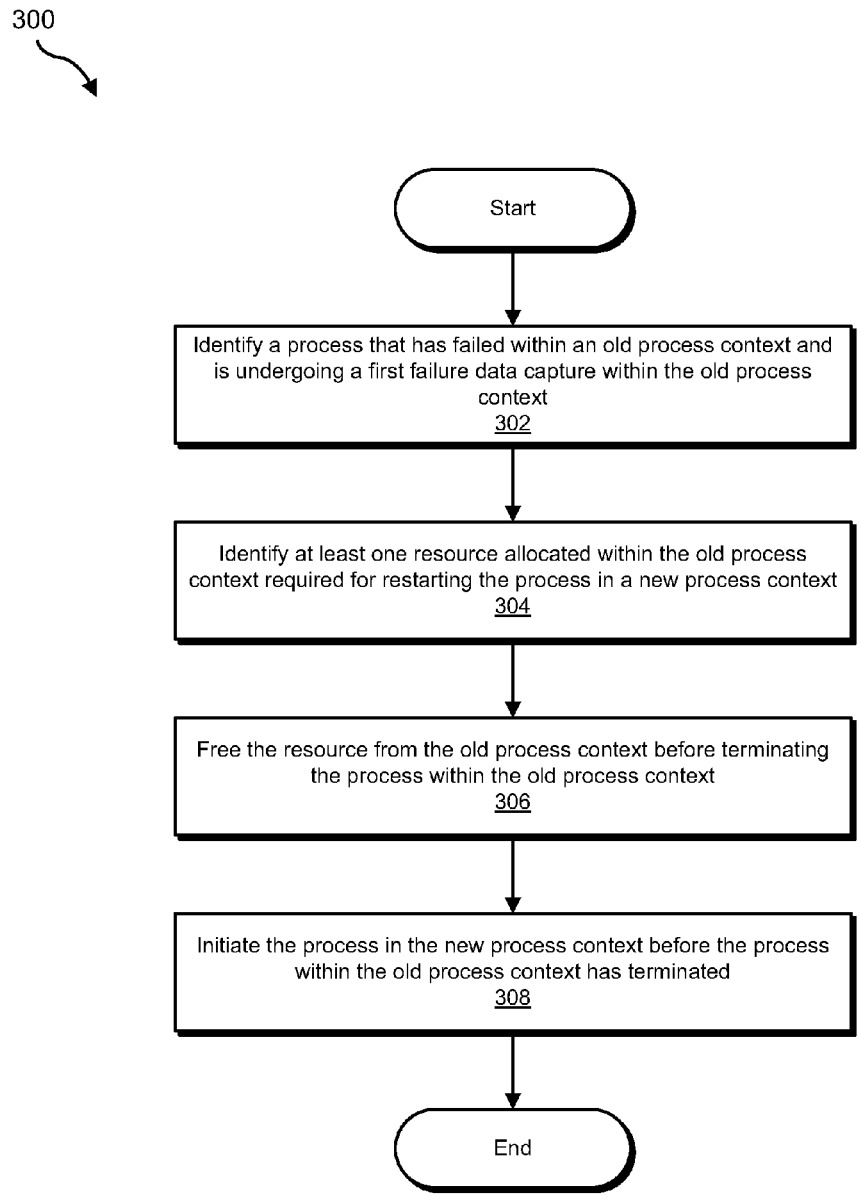
FIG. 3 is a flow diagram of an exemplary method for performing first failure data captures.

FIG. 3 is a flow diagram of an exemplary computer-implemented method 300 for performing first failure data captures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a process that has failed within an old process context and is undergoing a first failure data capture within the old process context. For example, at step 302 identification module 104 may, as part of computing device 202 in FIG. 2, identify process 212(1) that has failed within old process context 210 and is undergoing a first failure data capture within context 210.

As used herein, the term "process" may refer to any program in execution (e.g., an instantiation and/or running copy of a program expressed by an executable file). For example, the process may include an application, service, agent, and/or daemon in execution. Accordingly, "restarting" or "initiating" a process may refer to starting a new instantiation of any such program. In some examples, the process may include multiple processes, threads, and/or subprocesses. In some examples, the process may be configured for an immediate restart upon failure. For example, the process may play a role in providing high availability to data and/or services. The process may fail within any of a variety of contexts. In some examples, the process may fail within a non-virtual environment. For example, the process may fail outside of any hypervisor and/or virtual machine.

As used herein, the phrase "process context" may refer to any instantiation of a process, separable state in which a process executes, and/or state information relating to a process. In some examples, a process context may include and/or define one or more resource handles by which a process may access resources.

As used herein, the phrase "first failure data capture" may refer to any process for gathering and/or analyzing information from a process and/or process context upon a failure of a process. For example, a first failure data capture may gather information from a process and/or process context before fully exiting and/or terminating the process and/or process context for future debugging purposes. As used herein, the term "failure" as applied to a process may refer to any error and/or exception within the process leading to a first failure data capture of the process and/or termination of the process.

Identification module 104 may identify the failed process in any suitable manner. For example, identification module 104 may identify the failed process by receiving a message from the failed process. Additionally or alternatively, identification module 104 may receive a message identifying the failed process. In some examples, identification module 104 may identify the failed process by executing within the old process context. In at least one example, identification module 104 may identify the failed process by executing as a part of a first failure data capture routine for the failed process.

Figure 4:
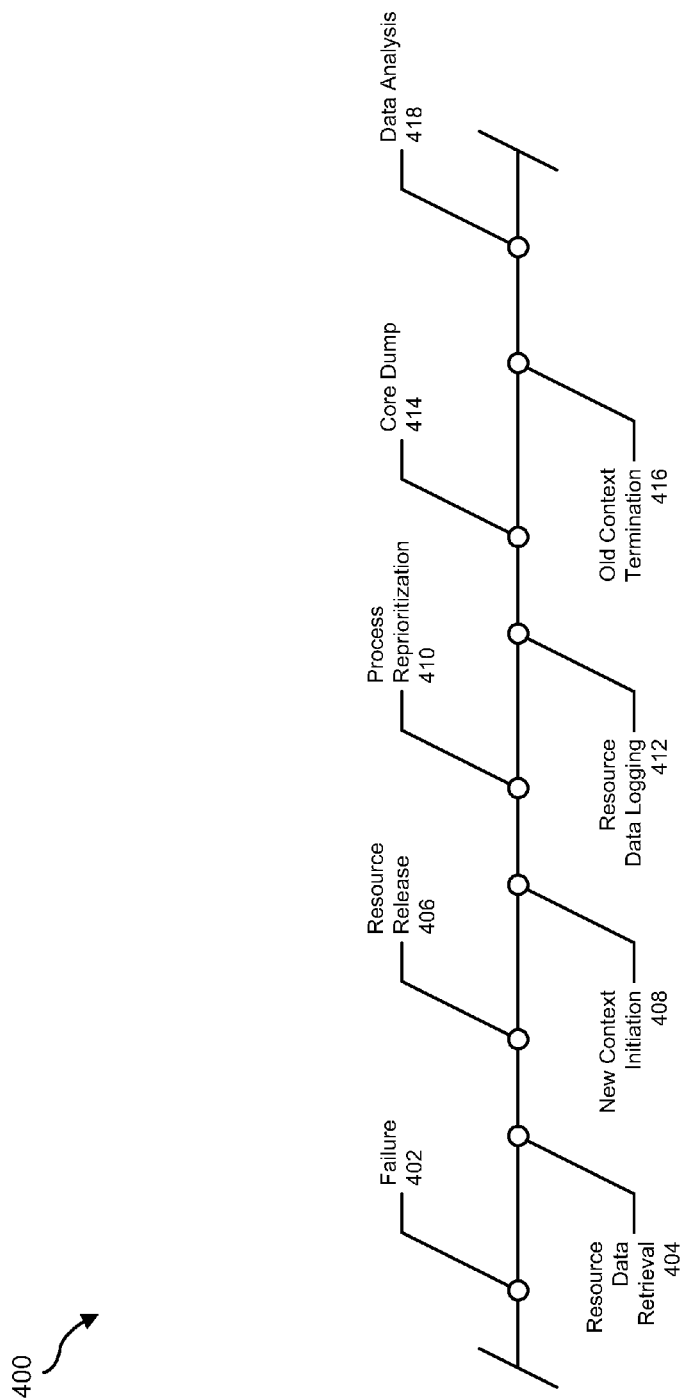
FIG. 4 is an illustration of an exemplary timeline for performing first failure data captures.

FIG. 4 illustrates an exemplary timeline 400 for performing first failure data captures. As shown in FIG. 4, exemplary timeline 400 may include a failure 402 (e.g., of the process). Using FIG. 4 as an example, at step 302 identification module 104 may identify the process after failure 402.

Returning to FIG. 3, at step 304 one or more of the systems described herein may identify at least one resource allocated within the old process context and required for restarting the process in a new process context. For example, at step 304 resource module 106 may, as part of computing device 202 in FIG. 2, identify resource 220 allocated within context 210 and required for restarting process 212(1) in new process context 230.

As used herein, the term "resource" may refer to any physical, logical, and/or virtual component of a computing system that may be used by and/or allocated to a process. Accordingly, the resource may include, a file descriptor (including, e.g., a file handle, a server socket, a device handle, etc.), a shared memory handle, a named pipe, a named socket, a named semaphore, and/or a mapped file. In at least one example, the resource may include a run and/or PID file. Generally, the resource may include any exclusive resource—e.g., a resource that cannot be and/or cannot safely be used and/or controlled simultaneously in more than one process context.

Resource module 106 may identify the resource in any suitable manner. For example, resource module 106 may identify the resource by executing within the old process context to which the resource is allocated. In at least one example, resource module 106 may identify the failed process by executing as a part of a first failure data capture routine for the failed process. In some examples, resource module 106 may identify the resource by including a fixed and/or predefined name and/or identifier of the resource. Additionally or alternatively, resource module 106 may identify the resource by querying a database with an identifier of the process to identify at least one resource used and/or required by the process. In some examples, resource module 106 may identify the resource as a part of retrieving data from and/or relating to the resource.

Using FIG. 4 as an example, exemplary timeline 400 may include a resource data retrieval 404 and a resource release 406. In some examples, resource module 106 may identify the resource before and/or as a part of resource data retrieve 404 and/or resource release 406.

Returning to FIG. 3, at step 306 one or more of the systems described herein may free the resource from the old process context before terminating the process within the old process context. For example, at step 306 freeing module 108 may, as part of computing device 202 in FIG. 2, free resource 220 from context 210 (e.g., by terminating resource allocation 222) before terminating process 212(1) within context 210.

Freeing module 108 may free the resource from the old process context before terminating the process within the old process context in any of a variety of ways. For example, freeing module 108 may first retrieve failure data for the first failure data capture from the resource. Freeing module 108 may free the resource after retrieving the failure data and before performing an additional first failure data capture operation within the old process context. As used herein, the phrase "failure data" may refer to any data that is potentially relevant to understanding, contextualizing, and/or analyzing the failure of a process. For example, if the resource includes a file handle, freeing module 108 may read from the file before releasing the file and performing additional first failure data capture operations. The additional first failure data capture operation may include any of a variety of operations. For example, the additional first failure data capture operation may include a core dump of the process. In some examples, the process may have included a large amount of working memory. By retrieving any needed information from the resource before releasing the resource and before performing and/or allowing a substantial additional first failure data capture operation such as a core dump, the systems and methods described herein may free the resource substantially sooner than otherwise and, as will be explained in greater detail below, thereby allow the resource to be allocated to the process in a new process context more quickly. Using FIG. 4 as an example, exemplary timeline 400 may include a new context initiation 408 (e.g., restarting the process within the new process context) after resource release 406 and before a core dump 414.

In some examples, freeing the resource from the old process context before terminating the process within the old process context may include 1) loading failure data for the first failure data capture from the resource into volatile memory, 2) freeing the resource after retrieving the failure data, and 3) writing the failure data from the volatile memory to a failure log file after freeing the resource. As used herein, the phrase "volatile memory" may include any temporary volatile and/or temporary storage location for data. For example, the phrase "volatile memory" may refer to random access memory. In some examples, the phrase "volatile memory" may refer to a storage location that allows for quicker write operations than a subsequent, more permanent storage location (e.g. the failure log file). By loading the failure data into volatile memory instead of directly to a log file, the systems and methods described herein may potentially free the resource more quickly than would occur by freeing the resource after writing the failure data to a log file. Using FIG. 4 as an example, resource data retrieval 404 may be followed directly by resource release 406. Exemplary timeline 400 may also include a resource data logging 412 subsequent to resource release 406 and new context initiation 408.

Freeing module 108 may free the resource in any suitable context. For example, freeing module 108 may free the resource as a part of a first failure data capture routine. For example, freeing module 108 may free the resource within the same function and/or script as (and/or a function and/or script called by) the first failure data capture. Additionally or alternatively, freeing module 108 may be executed in response to a system call performed in response to the failure of the process. Using FIG. 4 as an example of step 306, freeing module 108 may perform resource release 406 before an old context termination 416.

Returning to FIG. 3, at step 308 one or more of the systems described herein may initiate the process in the new process context before the process within the old process context has terminated. For example, at step 308 initiation module 110 may, as part of computing device 202 in FIG. 2, initiate process 212(2) (e.g., and allocate resource 220 with resource allocation 224) in context 230 before process 212(1) within context 210 has terminated.

Initiation module 110 may initiate the process in the new process context in any of a variety of ways. For example, initiation module 110 may initiate the process in the new process context by directly launching a new instantiation of the process. Additionally or alternatively, initiation module 110 may initiate the process by sending a message that the resource has been freed and/or the process is ready to be restarted. In some examples, initiation module 110 may operate as a part of a daemon configured to monitor the resource for availability in order to restart the process. Alternatively, initiation module 110 may initiate the process simply by having freed the resource, thereby allowing such a daemon to observe that the resource is free. In some examples, initiation module 110 may also allocate (and/or facilitate the allocation of) the resource within the new process context before the process within the old process context has terminated. Using FIG. 4 as an example, initiation module 110 may perform and/or facilitate new context initiation 408 before old context termination 416.

In some examples, one or more of the systems described herein may reprioritize the process within the old context. For example, initiation module 110 may reduce a priority of the process within the old context. As used herein, the term "priority" may refer to any value and/or condition determining the allocation of one or more resources to a process. For example, initiation module 110 may reduce a priority of the process within the old context resulting in the process within the old context being scheduled for fewer processing cycles. In some examples, initiation module 110 may reduce the priority of the process after freeing the resource. In this manner, subsequent first failure data capture operations within the old process context may interfere with primary operations (e.g., including the operation of the process within the new process context) to a lesser degree. In addition, the process within the new process context may restore availability to data and/or a service more quickly than otherwise. Using FIG. 4 as an example, after new context initiation 408, initiation module 110 may perform a process prioritization 410. Accordingly, resource data logging 412, core dump 414, and/or old context termination 416 may proceed with a lower priority than the process within the new process context. Additionally, as shown in FIG. 4, a data analysis 418 (e.g., of data logged in resource data logging 412) may occur after old context termination 416 (e.g., instead of before new context initiation 408).

As explained above, by freeing resources from failed process contexts before finishing first failure data capture operations, the systems and methods described herein may provide a lower time to recovery for processes without sacrificing the collection of debugging information. These systems and methods may thereby improve high availability linked to such processes, particularly on host systems with high load levels.

Figure 5:
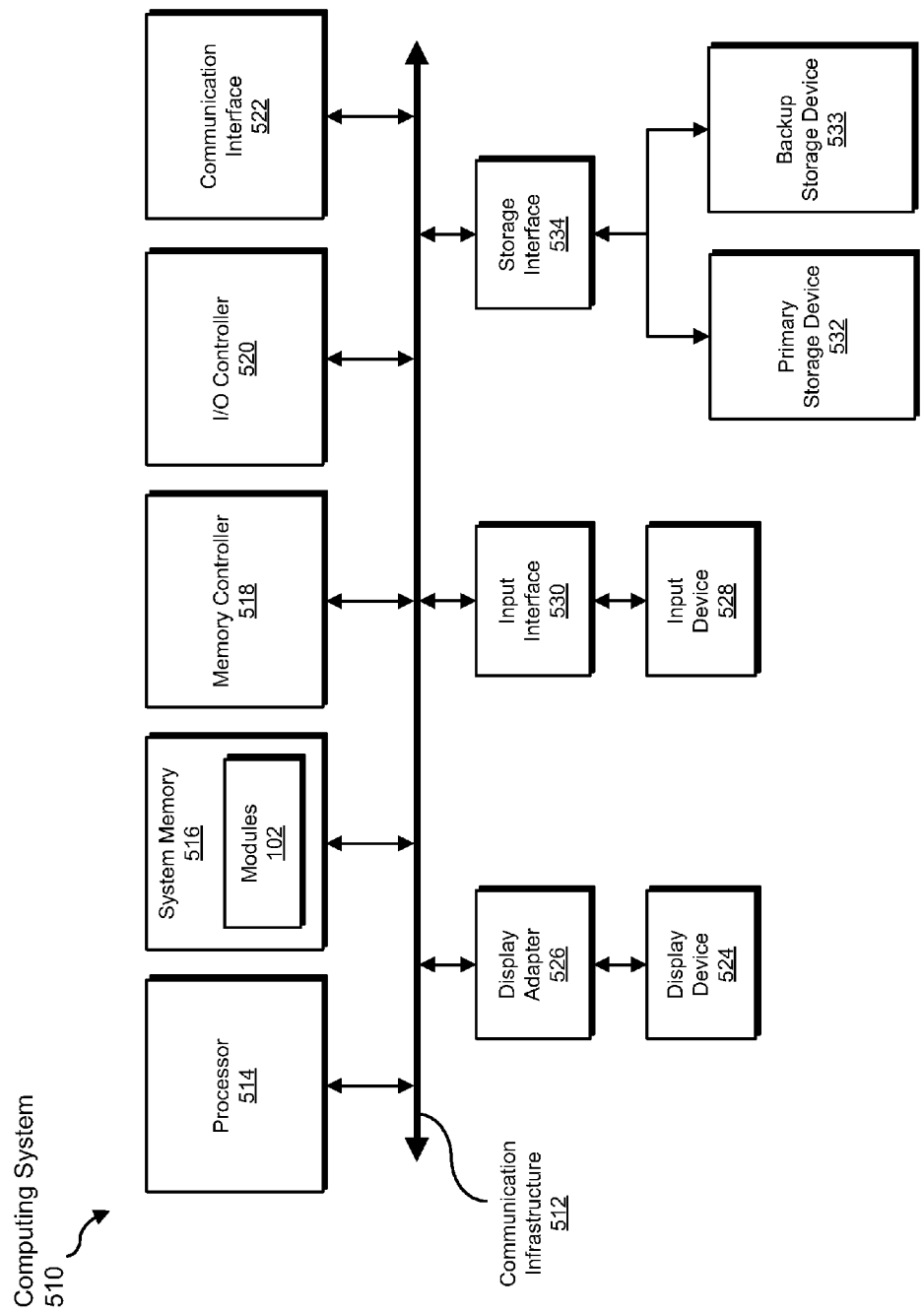
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, freeing, retrieving, loading, writing, initiating, and reducing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
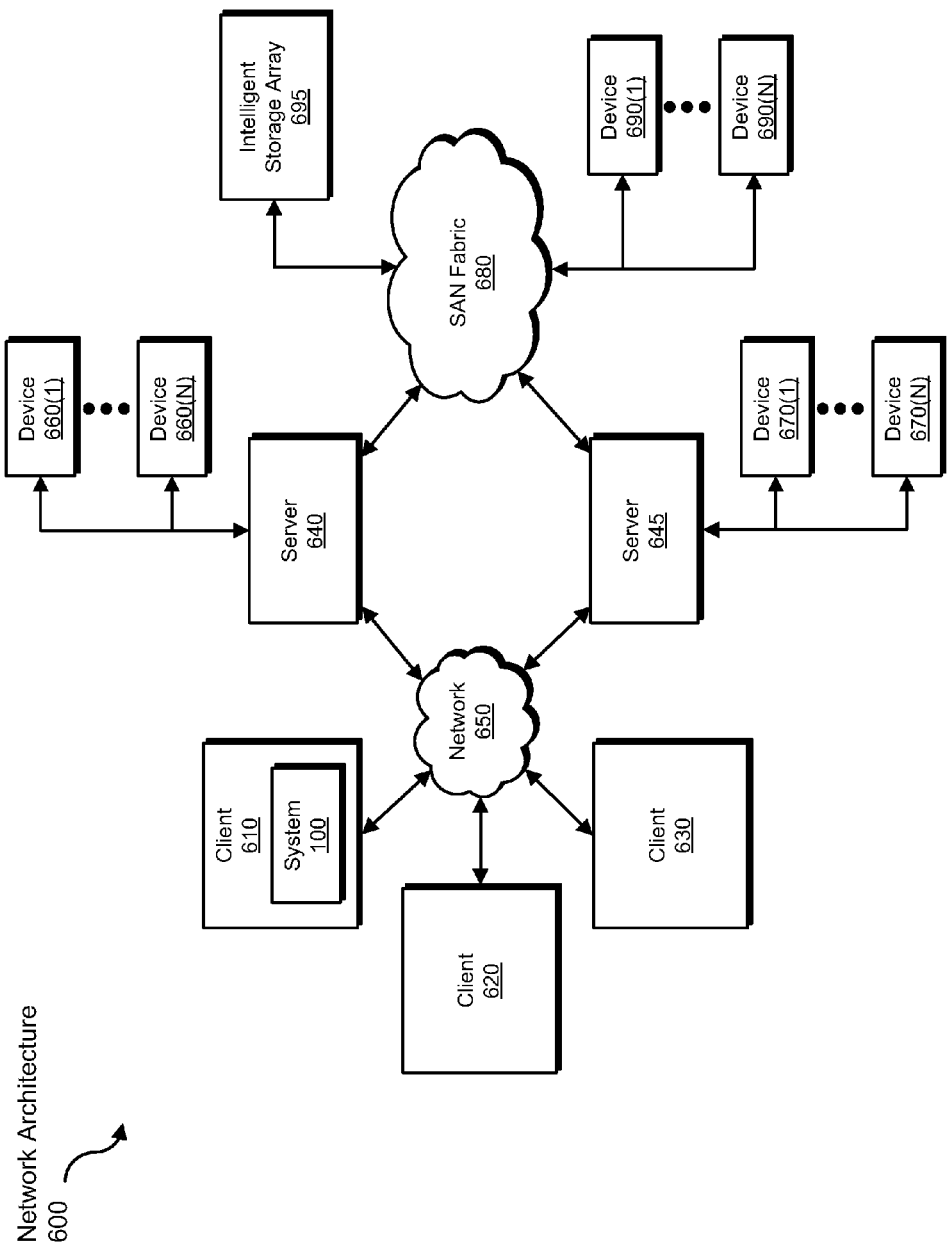
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, freeing, retrieving, loading, writing, initiating, and reducing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing first failure data captures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for more efficient first failure data capture.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing first failure data captures, at least a portion of the method being performed by a computing device comprising at least one processor, the method comprising:
   identifying a process that has failed within an old process context and is undergoing a first failure data capture within the old process context;
   identifying at least one resource allocated within the old process context and required for restarting the process in a new process context;
   freeing the resource from the old process context before terminating the process within the old process context;
   initiating the process in the new process context before the process within the old process context has terminated.

2. The computer-implemented method of claim 1, wherein freeing the resource before terminating the process within the old process context comprises:
   retrieving failure data for the first failure data capture from the resource;
   freeing the resource after retrieving the failure data and before performing an additional first failure data capture operation within the old process context.

3. The computer-implemented method of claim 2, wherein the additional first failure data capture operation comprises a core dump of the process.

4. The computer-implemented method of claim 1, wherein freeing the resource before terminating the process within the old process context comprises:
   loading failure data for the first failure data capture from the resource into volatile memory;
   freeing the resource after retrieving the failure data;
   writing the failure data from the volatile memory to a failure log file after freeing the resource.

5. The computer-implemented method of claim 1, wherein the resource comprises at least one of:
   a file descriptor;
   a shared memory handle;
   a named pipe;
   a named socket;
   a named semaphore;
   a mapped file.

6. The computer-implemented method of claim 1, further comprising reducing a priority of the process within the old context.

7. The computer-implemented method of claim 6, wherein reducing the priority of the process within the old context comprises reducing the priority of the process after freeing the resource.

8. The computer-implemented method of claim 1, wherein the process failed within a non-virtual environment.

9. A system for performing first failure data captures, the system comprising:
   an identification module programmed to identify a process that has failed within an old process context and is undergoing a first failure data capture within the old process context;
   a resource module programmed to identify at least one resource allocated within the old process context and required for restarting the process in a new process context;
   a freeing module programmed to free the resource from the old process context before terminating the process within the old process context;
   an initiation module programmed to initiate the process in the new process context before the process within the old process context has terminated;
   at least one processor configured to execute the identification module, the resource module, the freeing module, and the initiation module.

10. The system of claim 9, wherein the freeing module is programmed to free the resource before terminating the process within the old process context by:
    retrieving failure data for the first failure data capture from the resource;
    freeing the resource after retrieving the failure data and before performing an additional first failure data capture operation within the old process context.

11. The system of claim 10, wherein the additional first failure data capture operation comprises a core dump of the process.

12. The system of claim 9, wherein the freeing module is programmed to free the resource before terminating the process within the old process context by:
    loading failure data for the first failure data capture from the resource into volatile memory;
    freeing the resource after retrieving the failure data;
    writing the failure data from the volatile memory to a failure log file after freeing the resource.

13. The system of claim 9, wherein the resource comprises at least one of:
    a file descriptor;
    a shared memory handle;
    a named pipe;
    a named socket;
    a named semaphore;
    a mapped file.

14. The system of claim 9, wherein the initiation module is further programmed to reduce a priority of the process within the old context.

15. The system of claim 14, wherein the initiation module is programmed to reduce the priority of the process within the old context by reducing the priority of the process after freeing the resource.

16. The system of claim 9, wherein the process failed within a non-virtual environment.

17. A non-transitory computer-readable-storage medium comprising one or more computer-executable instructions that, when executed by at least one processor of a computing device, cause the computing device to:
    identify a process that has failed within an old process context and is undergoing a first failure data capture within the old process context;
    identify at least one resource allocated within the old process context and required for restarting the process in a new process context;
    free the resource from the old process context before terminating the process within the old process context;
    initiate the process in the new process context before the process within the old process context has terminated.

18. The computer-readable storage medium of claim 17, wherein the one or more computer-executable instructions cause the computing device to free the resource before terminating the process within the old process context by causing the computing device to:
    retrieve failure data for the first failure data capture from the resource;

free the resource after retrieving the failure data and before performing an additional first failure data capture operation within the old process context.

19. The computer-readable storage medium of claim 18, wherein the additional first failure data capture operation comprises a core dump of the process.

20. The computer-readable storage medium of claim 17, wherein the one or more computer-executable instructions cause the computing device to free the resource before terminating the process within the old process context by causing the computing device to:
    load failure data for the first failure data capture from the resource into volatile memory;
    free the resource after retrieving the failure data;
    write the failure data from the volatile memory to a failure log file after freeing the resource.

* * * * *